United States Patent

Berezin et al.

[15] 3,651,311

[45] Mar. 21, 1972

[54] INFORMATION SIGNAL GENERATION APPARATUS

[72] Inventors: Evelyn Berezin, New York; Edgar Wolf, New Hyde Park; William D. Cohen; Francis C. Marino, both of Huntington, all of N.Y.

[73] Assignee: Digitronics Corporation, Albertson, N.Y.

[22] Filed: Nov. 26, 1969

[21] Appl. No.: 880,322

[52] U.S. Cl.............235/61.11 D, 340/174 PM, 340/174 JA, 340/174.1 H

[51] Int. Cl...........................................................G06k 7/08

[58] Field of Search.............................235/61.114, 61.11 D; 340/174.1 F, 174.1 G, 174 SP, 174 PM, 346 PR; 179/100.2 C, 100.2 CF; 194/4; 222/2; 324/34

[56] References Cited

UNITED STATES PATENTS 2,782,989 2/1957 Knox.........................340/174.1 F UX 3,210,527 10/1965 Daykin.............................235/61.114

FOREIGN PATENTS OR APPLICATIONS 921,658 3/1963 Great Britain...................340/174.1 F

*Primary Examiner*—Maynard R. Wilbur
*Assistant Examiner*—William W. Cochran
*Attorney*—Yuter & Fields

[57] ABSTRACT

An information signal generating apparatus including a planar magnetic field shielding element which is provided with apertures representing coded information and through which a magnetic flux from a magnetic field source disposed on one side of the planar element is adapted to pass. A signal generator which may be in the form of a pair of facing pole pieces disposed on opposite sides of the planar element is adapted to move across the planar element and is provided with an inductively coupled winding. A current is induced in the winding when the pole pieces cut lines of force passing through the apertures thereby to produce electrical signals.

8 Claims, 7 Drawing Figures

*INVENTORS*
EVELYN BEREZIN
EDGAR WOLF
WILLIAM D. COHEN
FRANCIS C. MARINO

BY Yuter & Fields
ATTORNEYS

INFORMATION SIGNAL GENERATION APPARATUS

This application is a division of application Ser. No. 570,577, filed Aug. 5, 1966.

The present invention relates to apparatus for generating digital information signals and more particularly to the generation of signals representing digital information recorded as discrete indicia on a record medium.

In the data processing field there is now a need for inexpensive, manually operable input devices. One such class of input devices is a "point-of-transaction" input device. Such devices in the form of recorders are widely used, at present, in credit card systems. Other systems concern the processing of information on attendance badges, file cards, roll charts, etc. Credit card systems will be discussed in greater detail, since they are a striking example of a system having its weak link at the input end of the system. In a typical credit card system, the credit card serves as a "stencil" for supplying information usually by the printing of embossed characters (fixed information, i.e., card holder's name, address, identification number) on a record medium. The variable information, i.e., the amount of the transaction, is usually handwritten on the record medium. The record medium is then forwarded to an operator who converts the recorded information into machine readable language generally by key punching perforatable cards or tapes, which are fed to the processing part involved in getting the information from the point of transaction into the processor.

Many attempts have been made employing mechanical perforators and the like at the point of transaction. However, such devices are, generally, too complex and expensive for the typical point of transaction such as a gasoline station. Attempts have also been made to employ magnetic recording techniques. However, these attempts either required "on the fly" processes entailing complex apparatus or, if static, likewise required complex apparatus usually entailing a source of electrical energy. Furthermore, many of the point-of-transaction input devices are subject to environmental abuses, and have for this reason employed expensive components.

In the copending application Ser. No. 350,346, there has been described improvements in the input devices which record digital data on a magnetizable medium by magnetically shielding discrete areas of the medium, and then subjecting the medium to a magnetic field so as to change the magnetic state of the unshielded areas. The magnetic medium is then read by a magnetic reproducing head to generate the data signals that are fed to a data processor. While such a system solves many of the problems of point-of-transaction input devices, there are many applications requiring substantially online input devices, such as instantaneous credit checks of department store charge account holders by the sales clerks. Furthermore, the recording and subsequent reading operations require systems which are expensive. Accordingly, in such systems it is desirable to generate the data signals directly from the credit card or the like without the intermediate step of recording on a magnetizable medium.

It is, accordingly, a general object of the invention to provide a signal generator which satisfies the above cited requirements.

It is another object of the invention to provide such a signal generator which is not only simple and inexpensive but can easily and manually read data from a record medium and generate machine processable signals representing the data recorded on the record medium.

Briefly, the invention contemplates signal generating apparatus which includes a planar magnetic shielding element provided with a plurality of discontinuities such as apertures representing coded information. A magnetic field source means is disposed on one side of the planar element. The magnetic field only passes to the other side of the element via the apertures. There is further contemplated a signal generating means which comprises a flux concentrating element leaving a pair of pole facing pieces disposed on opposite sides of the planar element. A signal winding is inductively coupled to the flux concentrating element. The signal generating means is movable across the planar element in the region of the apertures to generate a signal wherever the signal generating means passes through a magnetic field passing through the apertures of the planar element. The apertures can represent the information or the inverse of the apertures can represent the information.

Other objects, features and advantages of the invention will be pointed out in the following detailed specification of which the claims form a part, and illustrated in the accompanying drawings, which show, by way of example, and not limitation, the principle of the invention and preferred modes for applying that principle.

Figure 2:
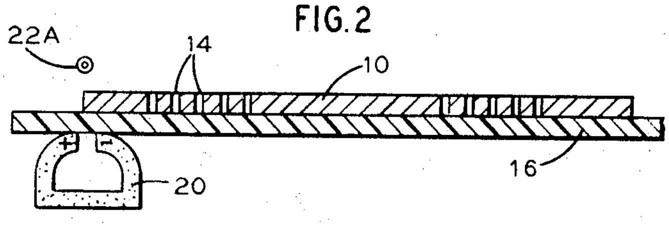
FIG. 2 is a sectional view of the signal generator taken along the line 2—2 of FIG. 1.
Figure 3A:
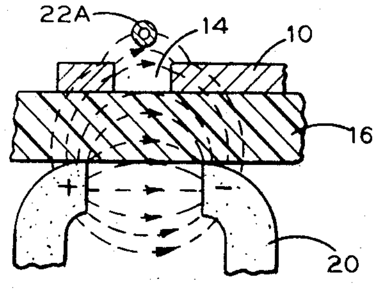
Figure 3B:
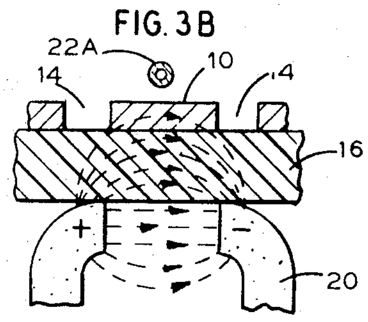
Figure 4:
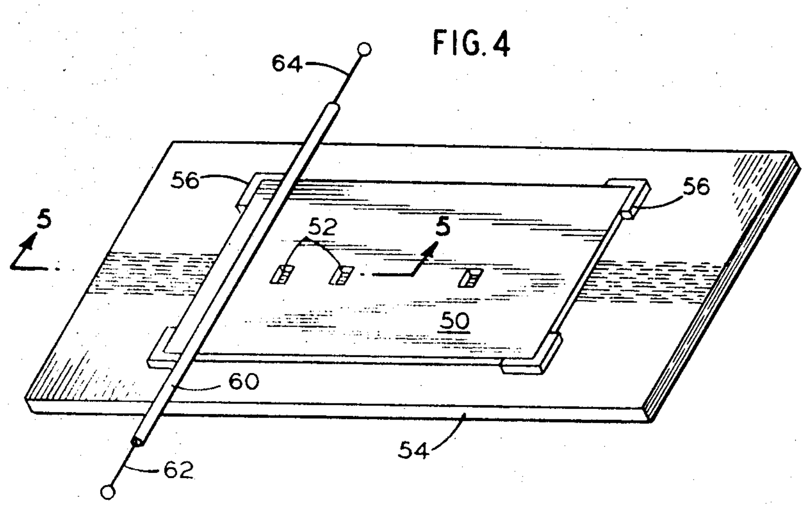
Figure 5:
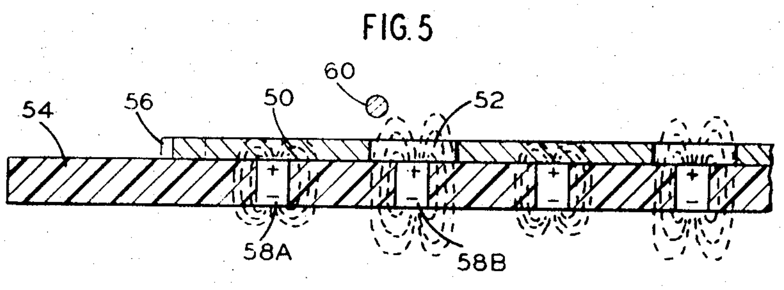

FIG. 3*a* is an enlarged fragmentary portion of FIG. 2 showing the magnetic field geometry when the magnet is opposite an aperture;

FIG. 3*b* is similar to FIG. 3*a* but shows the magnetic field geometry when the magnet is not opposite an aperture;

FIG. 4 is a perspective view of another embodiment of the invention;

FIG. 5 is an enlarged sectional view taken along the line 5—5 of FIG. 4; and

Figure 6:
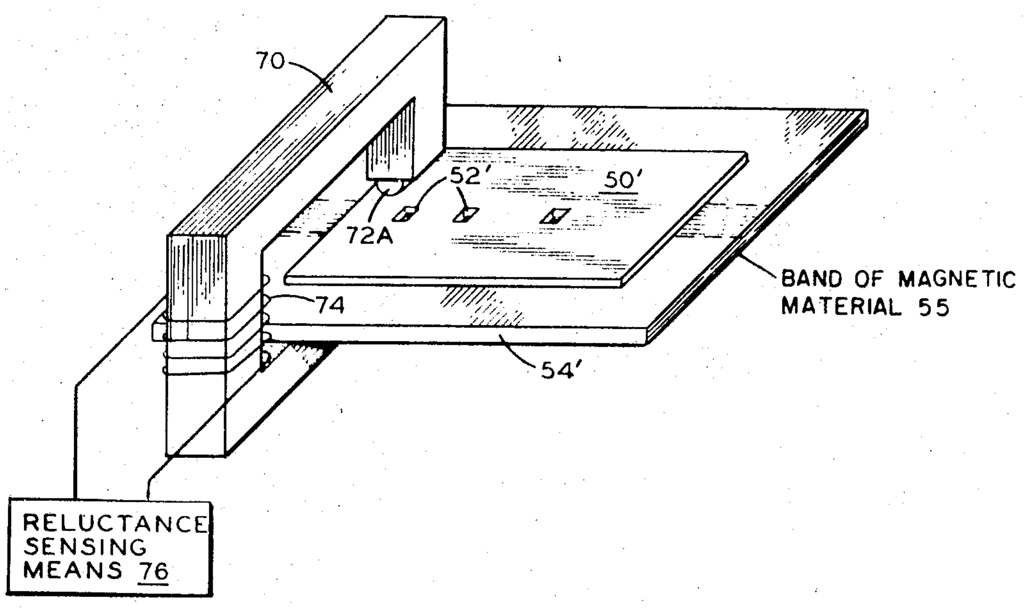

FIG. 6 is a perspective view of a third embodiment of the invention.

Figure 1:
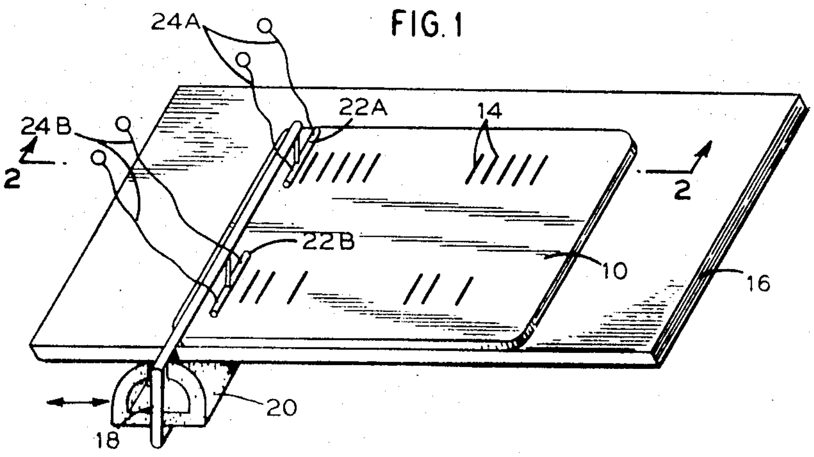
FIG. 1 is a perspective view of a signal generator, according to one embodiment of the invention, showing an apertured planar magnetic shielding element across which are simultaneously moved an electrical conductor and a magnet.

In FIG. 1 there is shown a magnetic shielding planar element 10, in exemplary form, as a credit card. The element 10 is provided with recording elements as apertures 14. In the exemplary embodiments of FIG. 1, two series of rectangular shaped elements are used since the signal generation desired is two series of pulses transmitted in parallel wherein one series (the upper series in FIG. 1) are "sprocket" (synchronizing) pulses and the other series (the lower) are coded combinations of information bits.

The planar element 10 is preferably made of a magnetically soft ferromagnetic material such as Mumetal. Mumetal is composed of: 71 to 78 parts of nickel; 4.3 to 6 parts of copper; 0 to 2 parts of chromium, and the remainder iron (See page 155 "Magnetic Recording Techniques" by Stewart, McGraw-Hill). Other magnetically soft materials with relatively high intrinsic saturation flux density and relatively low coercivity, i.e., less than 3 oersteds, can also be employed, for example, cold rolled steel is satisfactory.

Planar element 10 rests on a nonmagnetic support member 16. A movable carriage member 18 supports a permanent magnet 20 and electrical conductors 22. (See also FIG. 2) More particularly, magnet 20 has a pair of oppositely polarized pole pieces (+) and (−) which are adjacent one side of planar element 10. Conductors 22 are on the other side of planar element 10. Furthermore, the conductors 22 are disposed opposite the gap between the pole pieces, and conductor 22A is transversely aligned to move across the upper row of apertures while conductor 22B is transversely aligned to move across the lower row of apertures when carriage member 18 moves longitudinally with respect to planar element 10. Signal leads 24A and 24B are connected respectively to conductors 22A and 22B to transmit signals generated by the conductors.

By Faraday's law it is known that a voltage will be induced in a conductor which "cuts" through a magnetic field. Therefore, whenever one of the conductors 22 passes through a nonuniform magnetic field it will generate a signal. The purpose of planar element 10 and its apertures is to create a "binary-coded" discontinuous magnetic field.

Referring now to FIG. 3*a*, whenever the gap between the pole pieces of magnet 20 is opposite an aperture 14, magnetic flux (indicated by the dotted lines) leaves pole piece (+) and enters pole piece (−). Some of the flux passes through support member 16 and enters planar element 10. The flux entering element 10 "fringes" across aperture 14 with a portion of it being above the top surface of element 10. This fringing flux is cut by conductor 22A which generates a signal related to the speed of movement of the conductor through the fringing field and the magnitude of the fringing field. However, when the pole-piece gap is not opposite an aperture, any flux entering the planar element 10 at that point does not fringe into the region of conductor 22A. (See FIG. 3B). Therefore, conductor 22A cuts no flux at this time and no signal is generated.

It should be noted that the conductors 22 can be replaced by Hall effect detectors. In such a case, signal generation is independent of velocity.

In the embodiment of FIGS. 4 and 5 it is only necessary to move the conductor. The magnetic field is generated by fixed bar magnets. More particularly, planar element 50, which is similar to element 10 of FIG. 1, has similar apertures 52. The apertures are placed in preassigned regions of the element. Element 50 is placed on support member 54 and guided by bosses 56 onto a particular region thereof. Support member 54 is primarily composed of a nonmagnetic material in which are embedded permanent bar magnets 58. One of the bar magnets 58 is located at each of the possible positions of an aperture 50. Each of the bar magnets is aligned so that its axis intersects planar element 50. When a bar magnet, such as magnet 58A, is not opposite an aperture, its flux leaves the positive pole piece (+) flows inside element 50 and curves back to the negative pole piece (−). However, when a bar magnet, such as magnet 58B, is opposite an aperture 52, some of the flux passes through the aperture before curving back. Thus, magnetic flux is present on the side of planar element 50 remote from support member 54. Therefore, when a conductor 60 is moved across this side of element 50 a voltage is induced therein whenever it passes an aperture. At that time, a signal is transmitted from terminals 62 and 64 of conductor 60.

The invention can be used without inducing a voltage in a conductor. In FIG. 6 an embodiment is shown wherein the apertures are used to vary the reluctance in a magnetic circuit. Since many of the elements are the same as those described with respect to FIGS. 4 and 5, primed reference characters will be used and only the differences will be mentioned. Planar element 50′ is placed on support means 54′. Support means 54′ need not have bar magnets but may have a band of magnetic material 55 below apertures 52′. A flux concentrating element 70 has spaced and opposed pole pieces 72 which straddle element 50′ and support 54′. As flux concentrating element 70 moves longitudinally along support means 54′, pole piece 72A moves over the top surface of planar element 50′ and particularly past apertures 52′, and pole piece 72B (not shown) moves over the bottom surface of support means 54′. The reluctance of the magnetic circuit comprising flux concentrating element 70 and the gap between the pole pieces 72, is varied by the material in the gap. In particular, there is a discontinuous change in the reluctance when the gap includes one of the apertures 52′. The change in reluctance is most easily sensed by providing element 70 with a winding 74 which becomes part of an AC-energized tuned circuit of reluctance sensing means 76.

While only a limited number of embodiments have been shown and described in detail, there will now be obvious to those skilled in the art many modifications and variations which satisfy many or all of the objects of the invention but which do not depart from the spirit thereof, as defined by the appended claims. For example, instead of using discrete bar magnets in the embodiment of FIGS. 4 and 5, a single strip magnet can be used which spans all the apertures in the longitudinal direction of the planar element. The top edge of the strip magnet has one polarity while the bottom edge has the opposite polarity. Furthermore, electromagnets can be employed for the permanent magnets of FIGS. 1 to 5.

What is claimed is:

1. An information signal generating apparatus comprising a planar magnetic field shielding element, said element being provided with a plurality of discontinuities representing coded information, magnetic field source means disposed on one side of said planar element for generating a magnetic field which passes to the other side of said planar element only via the discontinuities, said magnetic field source means being a band of magnetic material positioned adjacent a plurality of possible discontinuities and signal generating means disposed relative to at least one side of said planar element and movable across said planar element in the region of said discontinuities for generating a signal whenever said signal generating means passes through a magnetic field on the other side of said planar element, said signal generating means comprising a magnetic flux concentrating element including a pair of pole facing pieces disposed on opposite sides of said planar element, said flux concentrating element being movable past the discontinuities of said element, and a signal winding inductively coupled to said flux concentrating element.

2. An apparatus as in claim 1, wherein said magnetic field source means comprises means for supporting said planar element and magnetic means included in said supporting means and wherein said pair of pole pieces straddle both said planar element and said supporting means.

3. An information signal generating apparatus comprising a planar magnetic field shielding element, said element being provided with a plurality of discontinuities representing coded information, a support surface adopted to support said planar magnetic field shielding element thereon, a plurality of magnetic field source generating means embedded within said support along a plurality of locations including those positions coinciding with the position of said discontinuities, said magnetic field source generating means oriented so as to provide a magnetic field in the area of each field source generating means locations, which passes to the other side of said planar magnetic field shielding element only via the discontinuities, and signal generating means disposed, at least, on the other side of said planar element and movable across said planar element in the region of said discontinuities for generating a signal whenever said signal generating means passes through a magnetic field on the other side of said planar element.

4. The combination of claim 3 wherein said signal generating means comprises an elongated electrical conductor movable parallel to the plane of said planar element for intersecting the magnetic flux passing through the discontinuities whereby a current indicative of said signal is induced in said elongated conductor.

5. The combination of claim 3 wherein each of said magnetic field source generating means is a permanent bar magnet each located at a possible position of a discontinuity.

6. The combination of claim 4 wherein each of said magnetic field source generating means is a permanent bar magnet, each located at a possible position of a discontinuity.

7. The combination of claim 3 wherein said signal generating means comprises a magnetic flux concentrating element including a pair of pole facing pieces disposed on opposite sides of said planar element and support surface, said flux concentrating element being movable past the discontinuity of said planar element, and a signal winding inductively coupled to said flux concentrating element.

8. The combination of claim 7 wherein said magnetic field generating means is a band of magnetic material positioned adjacent a plurality of possible discontinuities.

* * * * *